(12) United States Patent
Manto (10) Patent No.: US 6,285,749 B1
(45) Date of Patent: Sep. 4, 2001

(54) SYSTEM AND METHOD FOR PROVIDING UNIVERSAL TELECOMMUNICATIONS SERVICE AND THIRD PARTY PAYER SERVICES

(76) Inventor: Charles L. Manto, 2104 Paul Edwin Ter. #302, Falls Church, VA (US) 22046

( * ) Notice: Subject to any disclaimer, the term of this patent is extended or adjusted under 35 U.S.C. 154(b) by 0 days.

(21) Appl. No.: 09/193,732

(22) Filed: Nov. 17, 1998

Related U.S. Application Data
(60) Provisional application No. 60/066,929, filed on Nov. 17, 1997.

(51) Int. Cl.[7] .......................... H04M 15/00; H04M 17/00
(52) U.S. Cl. .......................... 379/114; 379/111; 379/112; 379/144
(58) Field of Search ...................... 379/114, 115, 379/118, 177, 183, 120, 121, 127, 201, 243, 144, 111, 112

(56) References Cited

U.S. PATENT DOCUMENTS

| | | | | |
|---|---|---|---|---|
| 5,146,491 | * | 9/1992 | Silver et al. | 379/114 |
| 5,381,467 | * | 1/1995 | Rosinski et al. | 379/121 |
| 5,539,807 | * | 7/1996 | Ghisler et al. | 379/58 |
| 5,557,664 | * | 9/1996 | Burns et al. | 379/114 |
| 5,563,933 | * | 10/1996 | August et al. | 379/115 |
| 5,579,379 | * | 11/1996 | D'Amico et al. | 379/112 |
| 5,602,907 | * | 2/1997 | Hata et al. | 379/114 |
| 5,621,787 | * | 4/1997 | McKoy et al. | 379/144 |
| 5,754,633 | * | 5/1998 | Levy | 379/114 |
| 5,805,680 | * | 9/1998 | Penzias | 379/118 |
| 6,055,306 | * | 4/2000 | Lozinski et al. | 379/230 |

\* cited by examiner

*Primary Examiner*—Curtis Kuntz
*Assistant Examiner*—Quoc D. Tran
(74) *Attorney, Agent, or Firm*—Greenberg Traurig; Richard E. Kurtz, II (57) ABSTRACT

A method of operating a telecommunications device wherein the telecommunications device is used to detect an outgoing call from a calling party to a called number. The calling number is used to determine whether or not the calling party is a universal service user. If it is determined that the called number is among a class of numbers exempt from charges, the call is connected. A determination on the sufficiency of funds in a pre-paid account is made. If it is determined that there are insufficient funds in a pre-paid account to cover charges associated with the outgoing call, a message is generated and sent to the calling party or a third party requesting authorization to charge an additional fee for connecting the calling party with the called party. User input is received from the calling party, indicating the calling party's authorization of such charge. The connection between the calling party and the called party is made.

4 Claims, 5 Drawing Sheets

SYSTEM AND METHOD FOR PROVIDING UNIVERSAL TELECOMMUNICATIONS SERVICE AND THIRD PARTY PAYER SERVICES

This application claims the benefit of U.S. Provisional Application No, 60/066,929 filed Nov. 17, 1997, the entire disclosure of which is hereby incorporated by reference,

BACKGROUND OF THE INVENTION

Over the years, worldwide consideration has been given to the universal service problem the desirability of providing telephone service to those who cannot afford to pay and maintain telephone service. Networks are significantly more valuable as more users are able to use the network, and the lack of universal service is a bier to economic participation by those ling service. Societal benefits of having even the poorest on the public telecommunications network are so significant that it new U.S. Telecommunications Act of 1996 makes special provisions for universal service as part of the Act, including mechanisms to implement subsidized activities. Many states have life-line services which subsidize telecommunications services for users who meet certain low income tests.

Internationally, there arc even larger universal service problems as nations such as the Philippines, China, mad the republics of the former Soviet Union try to entice investment in their respective telecommunications infrastructures. In these emerging markets, the number of telecommunications lines per capita is much smaller. Because market-based solutions to the universal service problem in these markets are lacking, capital for network infrastructure is limited.

Therefore, there is a need for an improved apparatus and operating methodology that provides a market-based solution to the universal service problem.

SUMMARY OF THE INVENTION

The present invention relates to a novel and substantial solution to the problem of providing phone service for those without proven means to pay, providing, voice, data, and multi-media services. The invention provides an apparatus and a related method for controlling public network switching activity in a manner which makes it possible to provide universal service, by providing a telephone line to a party without charge, and providing metered billing to persons wishing to contact the party. This method effectively provides universal service for telecommunications voice and/or multimedia applications, without tax or market subsidies.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being upon illustrating principles of the invention.

DETAILED DESCRIPTION OF THE PREFERRED EMBODIMENTS

The present invention provides software operating in telephone central office switches and/or their intelligent peripherals. Such operating software may also be installed in other network devices for wireline and wireless local loop services and long distance services, in user equipment including switches, PBX's, telephony system, controlling local area networks, and wide area networks, and to provide universal access to portable telephones, pagers and other electronic communications devices.

The present invention makes it possible to include far more people in a given network, and also makes it possible to simplify participation of multiple local and long distance service providers in any given market.

The invention will be described in terms of a preferred embodiment in which telephone service is provided that is totally free to the user, yet is paid for by third parties. However, those skilled in the art will understand that the inventive concepts can be similarly applied to billing and connection services for other communications network.

Now, whenever a telephone user is about to be cut off from service, the software according to the invention will make it possible to cut the user off from credit incurring calls. However a telephone, the software still allows the user to place collect calls, 1-800 or 1-888 calls, 911 calls, or third party charge calls, resulting in revenue to the service provider from third parties. Furthermore, this software will intercept incoming calls before completion and ask the caller pay an extra premium of, for example, a defined price per minute. When the user accepts this offer and demonstrates ability to pay either through their own credit based phone bill, their pre-paid bill, or some other acceptable credit or debit means, then the caller is allowed to complete the call to the user. Once the call is completed, the caller is billed for the additional fee, making it possible for the service provider to the user of free phone service to make a profit, thus providing a market based mechanism to provide universal service. This concept is preferably implemented, according to the present invention, using control and billing software particularly adapted for this purpose.

With the control and billing software configured according to the present invention, it is possible to roll out new phone service to users who normally cannot afford to establish phone service. This is true both in U.S. and emerging markets world wide. This provides a significant advantage, making existing networks more viable, and making it possible to finance new networks at an accelerated rate. More users, whose bills will be paid by willing third parties, will make it possible for companies to meet return on investment targets earlier than would otherwise be possible.

Furthermore, network service providers will be able to connect more users sooner at a more cost effective rate. For example, when a service provider comes into a new neighborhood, the service provider can wire up an entire community instead of only the portion of the community that can meet credit standards. This is a problem not only for domestic cable television operators, and new competitive local exchange carriers but for both incumbent and alternative local exchange carriers overseas. Up until now, a new service provider brings infrastructure to anywhere between twenty and eighty percent of the local population, and then goes back on a case by case basis to add additional customers. With this approach, the new service provider can provide user connections to an entire community at once, at far less cost than sending in technician teams later, by offering non-credit service to those who do not meet a predetermined credit or debit standard.

This feature enabled by the present invention makes it possible for much desired competition to develop sooner.

Users who normally can pay a subscription fee for one service provider may not switch to another, and certainly would not want to use two suppliers, may consider using a second supplier for certain services if the basic service is either free or paid by third parties. These third parties may either be callers, advertisers, or other financially interested parties. This will also foster competition and infrastructure investment since this will allow new Local Exchange Carriers (LECs) to offer services with confidence that the bills will be paid by someone with established credit or debit relationships. This is a substantial problem both for traditional CLECS and large users who may elect to become CLECs.

An example of the benefit of this approach to other financially interested third parties is its application to providers and payers of medical services. In the case of a poor elderly patient, the patient today may require hospital admission for special observation, at a cost of tens of thousands of dollars. Using the present invention's approach to telecommunications control and billing, it will be possible to save the medical services payer from substantial costs by making use of high bandwidth multi-media telecommunications universal service applications. This would even be true for those with no ability to pay for even a standard voice subscription, let alone high or very high bandwidth lines. In the case of the indigent elderly, both normal and high bandwidth media lines may be available to the resident, since everyone in the community can be wired for all new services as they become available in a neighborhood.

When it becomes apparent that the indigent elderly resident needs special medical observation, the provider and payer of medical services may find that it is more effective and less expensive to have home health care nurses provide service and hook up medical diagnostic and monitoring equipment through the high bandwidth communications lines between the patient and the hospital. As long as the payer finds that the monitored home health care costs are lower, the medical service provider/payer will be more than happy to pay for the additional communications costs, since they will save far more than they will spend.

The present invention has particular application to organizations which may become part of competitive local exchange carrier partnerships, including hospitals, universities, local governments, hotels, and other large users. The benefits to these organizations include billing protection from the bad debts usually associated with the launch of a new telecommunications product or market.

The third party payer software capabilities according to the present invention can also be tied into normal credit, new debit, and prepaid options. In this way, customers who start with either a credit standing, and fail to pay their bills, can automatically be switched to the "free universal service" plan, or one with a pre-paid service can be switched to the "free universal service" plan should their pre-paid funds run out.

The features of the present invention make it possible to service the poor without requiring them to meet income tests. In many cases, life line service is of no value to the poor because the poor often don't know about the life line program in the first place, don't know how to apply, find their applications slow to be approved, or find that they don't meet a particular requirement, though they still cannot afford the service.

The software according to the present invention will now be described in more detail with reference to FIG. 1, which is a flowchart showing an inventive process for delivering Incoming Calls to a Universal Service User. This software is implemented as part of a conventional call processing and control system in, for example, a central office switch.

Figure 1A:
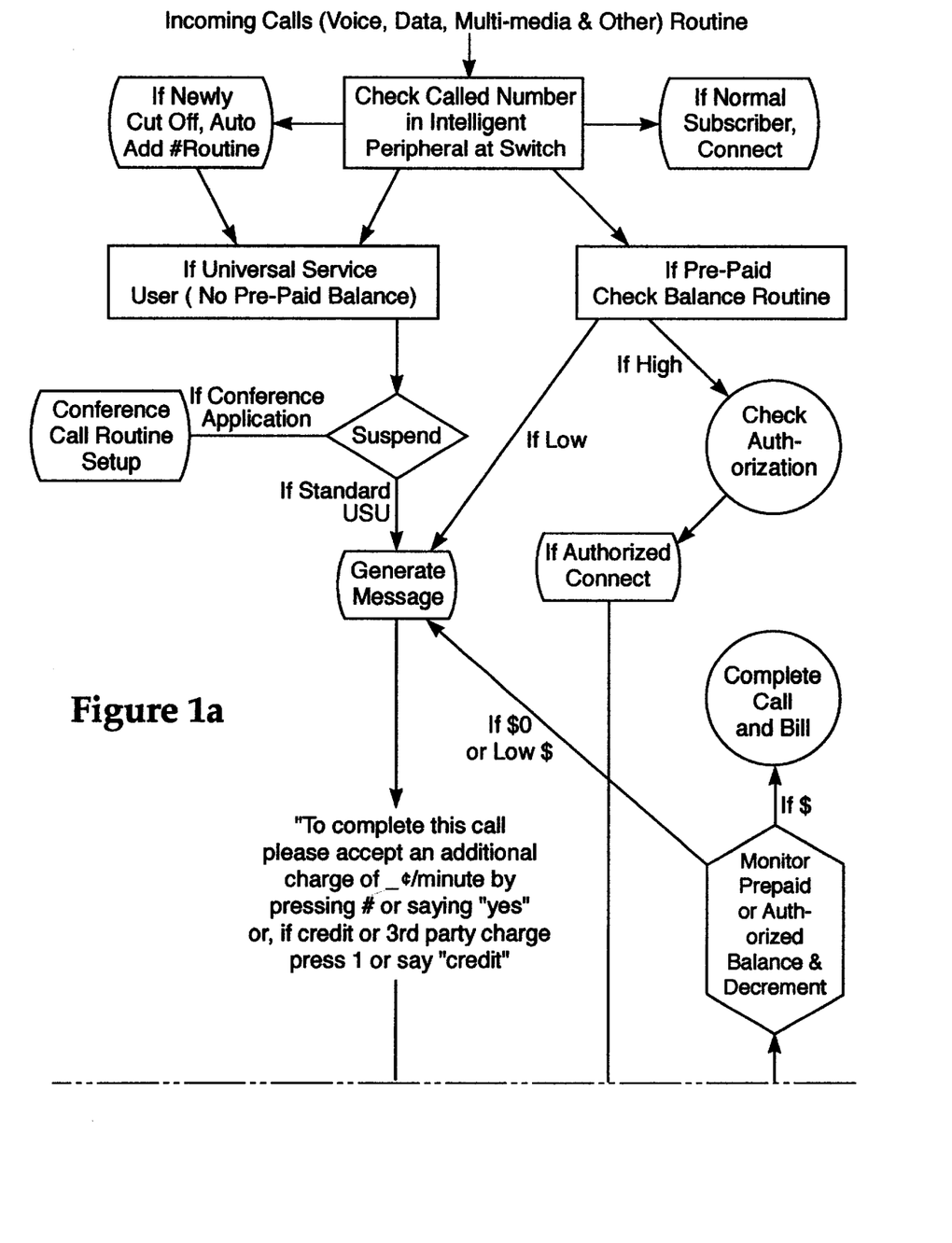
FIG. 1 is a flowchart showing an inventive process for delivering Incoming Calls of a Universal Service User.
Figure 1B:
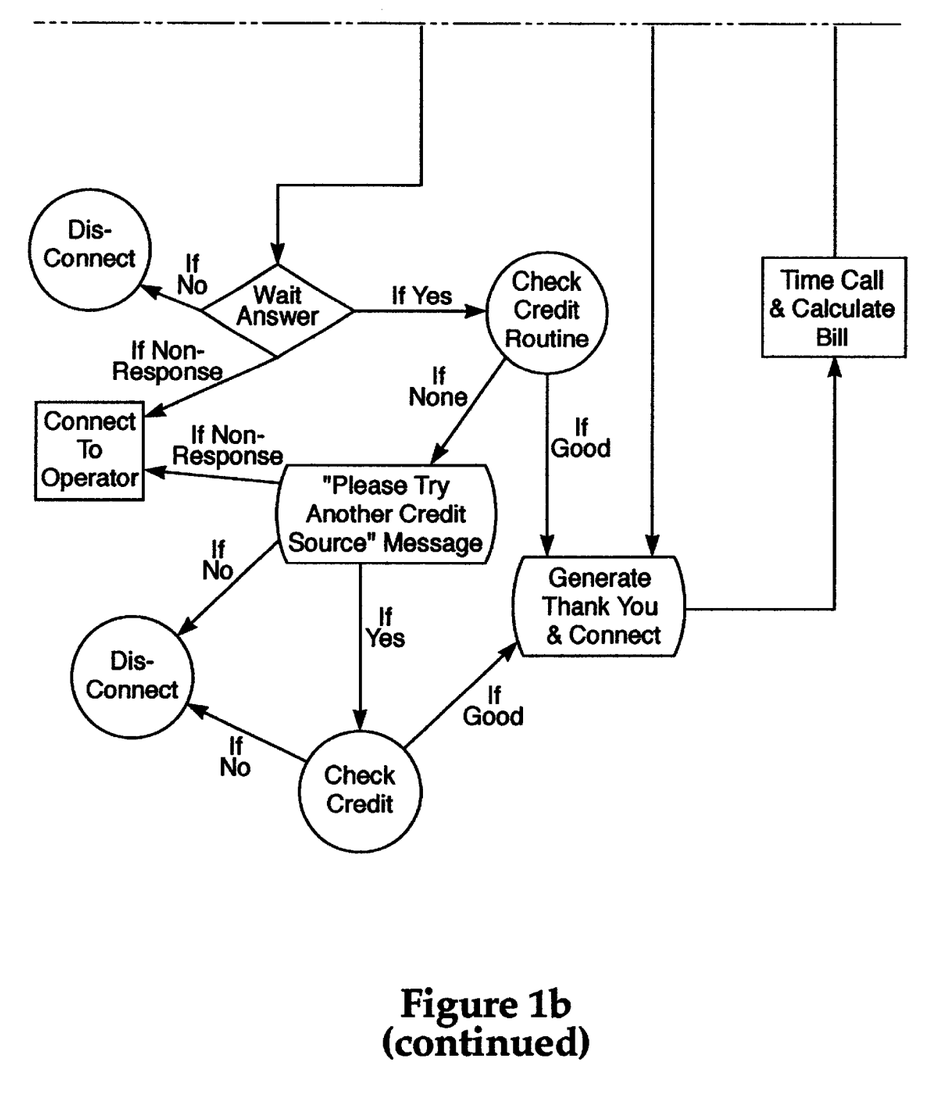

As shown in FIG. 1, when the calling party initiates a call to a universal service participant, the calling party's call will be intercepted by the local exchange switch or intelligent peripheral to see if the called party is a Universal Service User (with either non-subscriber or special subscriber status such as a pre-paid status). If a call is not connectable by a local switch, it will also be diverted to the Universal Service User Data Base so that the unserviceable number can be added to the USU set-up routine so that the caller may be able to complete the call. When the called party is determined to be a Universal Service User, the account will be examined to see if it is a pre-paid account or not. If it is a pre-paid account, the balance will be checked to see if there is enough funds in the account to cover the call. If there is sufficient funds in the account, then the call is completed unless it must first go through an authorization routine described below.

If there are not enough funds in the account, or, if a pre-paid account is not established, then the calling party will, before the call is completed, hear a voice on the line (or see a message or receive an indication one way or another) that will inform the caller that they are reaching a number which requires an additional payment of x cents per minute to complete the call or service in the case of a multimedia call or other service. By pressing the # key, or by saying "yes", they are indicating willingness to pay the additional charge. Once the party has agreed to the charge, (and the ability to pay is confirmed) the call is then completed and the call is billed to the paying party or parties. In this way, the called party with free phone service receives the call, and the service provider paying for the free service can recoup its investment in providing this access. The software both interrupts the caller, queries the caller, determines whether to complete the call by seeing if the caller is willing and in many cases able to pay for the call, completes the call, and then bills the call.

The software may also provide for any call forwarding or earmarking of users who are identified as universal service clients, and any other requirements that may be established in the negotiations that are required between incumbent local exchange carriers (ILECs) and competitive local exchange carriers (CLECs).

The present invention also provides processing for incoming calls to pre-paid accounts, and a setup to transfer to Universal Service User (USU) Status. The Universal Service User may also may be provided with monthly subscription services and/or measured services prepaid by the Universal Service User, or by third parties. When calls come into such an account, the prepaid account may be checked for an account balance to see if the call or service can be completed and paid by the funds left in the pre-paid account. If the account is sufficient, the call or service is completed and monitored for account balance in real time, but if the account is depleted or low or becomes low during the call, then the message to the caller is generated, requesting that the caller agree to pay to complete the call or service. (This allows for prepaid accounts with or without prepaid cards that are payable by third parties, not just the user, and allows the prepaid user to continue using telephony service once the prepaid account is depleted.)

The present invention also provides a mechanism for processing incoming calls to pre-paid accounts for restricted or authorized users. The value of this type of third party paid account is that the payer of the account can restrict the availability of those calls to callers that are authorized to make certain types of calls which can be verified either by a personal identification number (PIN) or digital signature. In this way, calls can be paid for by a medical plan that will cover authorized calls to the user by authorized medical personnel attempting to deliver services to the Universal Service User. The same type of service may be available to government agencies attempting to contact or deliver services to the Universal Service User. The service may be paid by one agency but usable by other authorized agencies. Similarly, teachers in school systems may be authorized to call their students or the students' parents. Again, security codes such as PIN numbers, digital signatures, smart cards, interactive video, or other security systems including but not limited to pseudo-random number generators, finger print, bio-feedback, infrared scans of capillary heat generation, retina scans, etc. can be used as means to verify authorized users.

The present invention also provides an improved processing method for automated conference calling for medical, research, public safety and security applications. Users can be identified for operation of an automatic conference call application such as a research or medical application needing connection to multiple health care providers, or, by authorized law enforcement agencies with warrants for legal wiretaps so that when a call is placed to such a user, instead of having the call suspended and given the voice message that an additional charge is required, it can be tied in as a conference call to a law enforcement recording device that would enable the collection of telephonic evidence. This would allow for tapping of the call without substantial effort by the carrier or investment by the government, producing savings estimated at over $500,000,000.

The present invention also provides a novel software application and mechanism for controlling and billing outgoing calls from Universal Service Users. A preferred embodiment of this mechanism will be described with reference to FIG. 2, which is a flowchart showing an outbound calling process according to the invention.

Figure 2A:
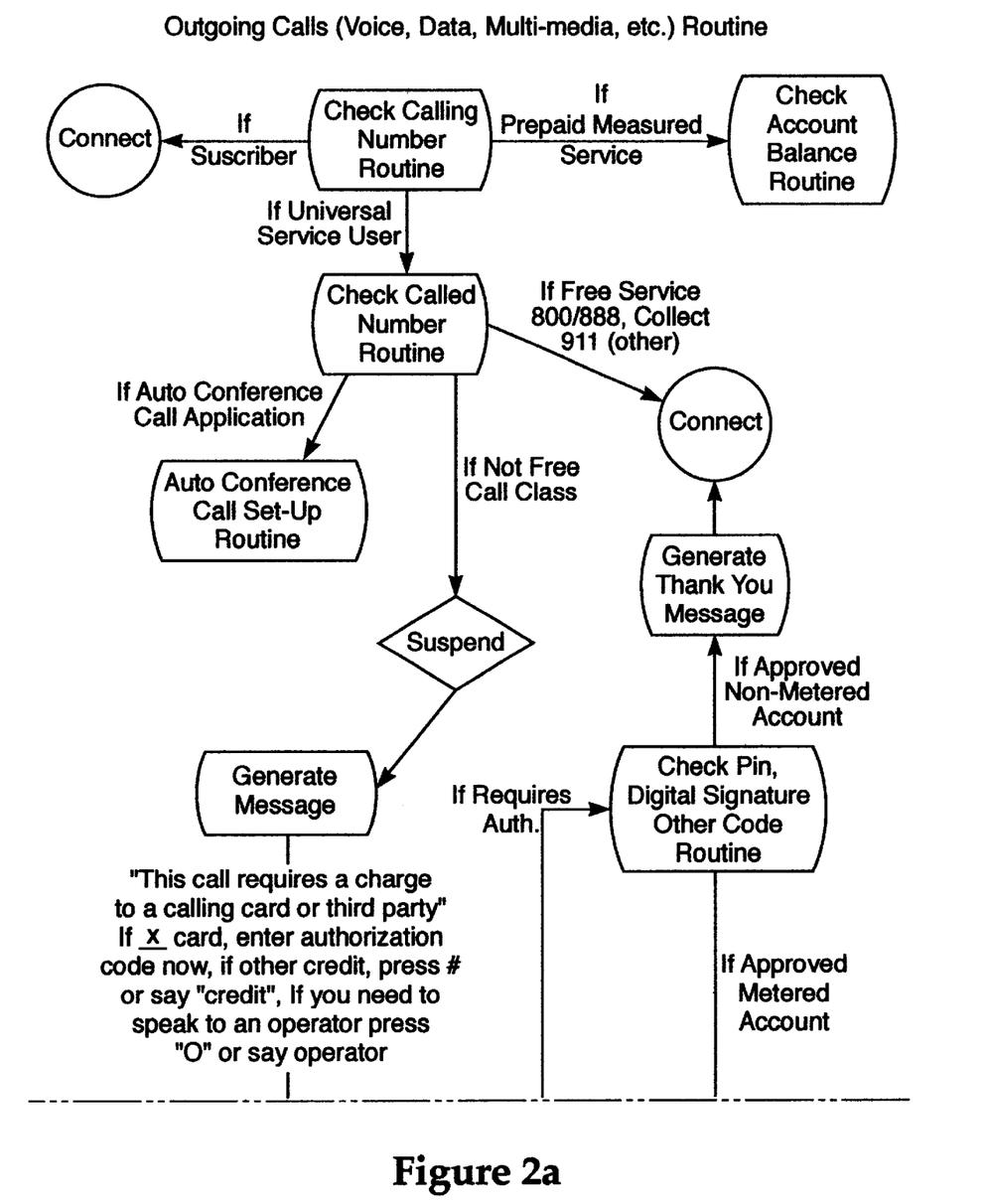
FIG. 2 is a flowchart showing an outbound calling process according to the present invention
Figure 2B:
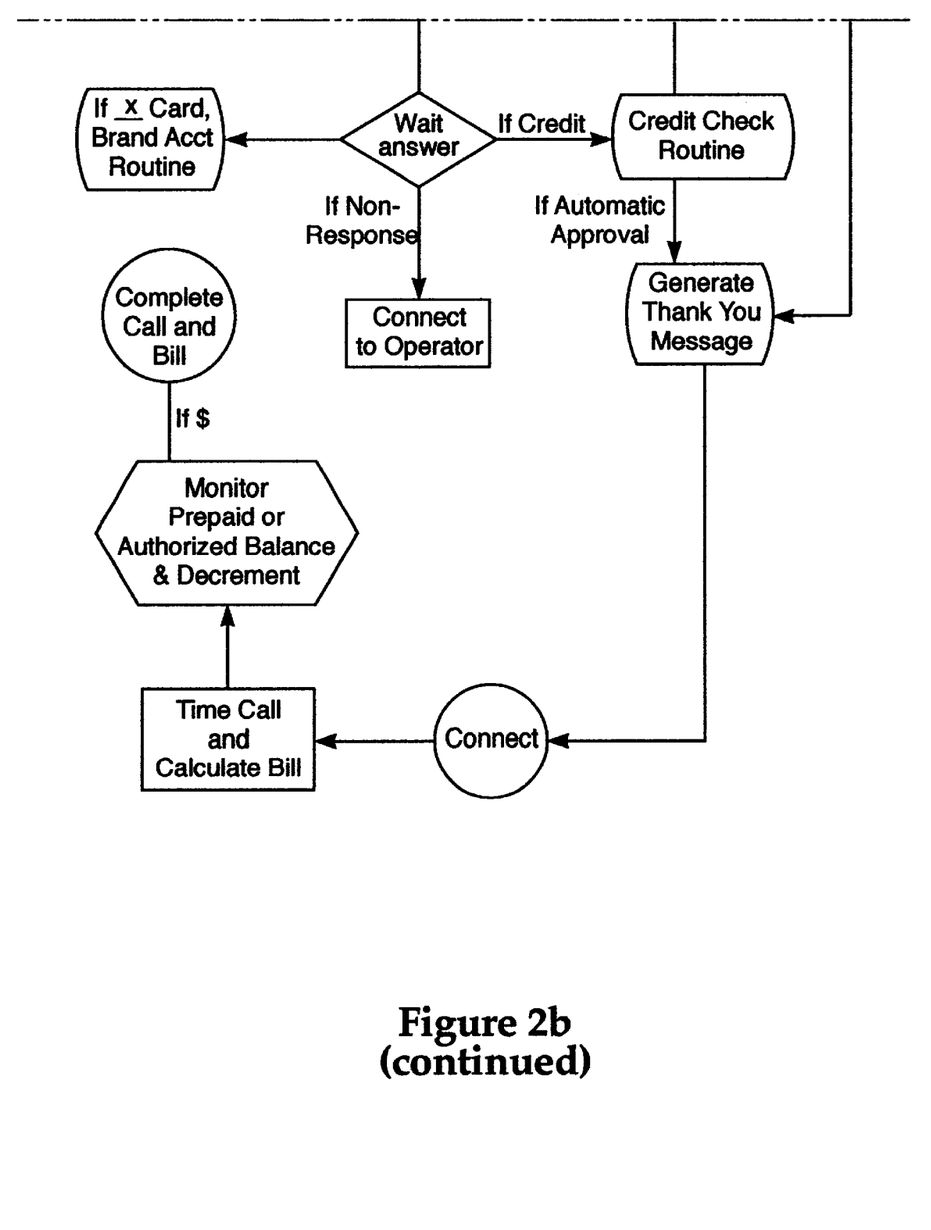

When the universal service participant makes calls, they are restricted to collect calls (including local), or other third party payer arrangements such as 1-800/888 or 911 calls. However, they may also elect to arrange for pre-paid services which may provide certain services until those fluids are used, at which time, the Universal Service User reverts to the non-credit/debit call restrictions. These pre-paid services may either be subscription-based or measured services.

The measured services, such as long distance, may be limited to pre-paid limits or to specific numbers or by specific uses and or users determined by PIN codes, digital signature, or other security measure described above. This will be able to account for multiple users at a location or household with different authorization levels which will eliminate unauthorized use of credit, which is one of the reasons why many users have bills they cannot subsequently pay.

This will also make it possible for users to be authorized on the condition that they call pre-identified numbers from any location or phone account that can be billed to third parties with financial or other incentives to sponsor the call. For example, a pizza delivery service or a personal injury lawyer may establish an agreement with the service provider to pay for any incoming calls to their office initiated by Universal Service Users, in the expectation that such calls will provide business opportunities.

The software which intercepts the call is preferably either in the switch or in an intelligent peripheral of the local service provider, even if the local service provider is a Competitive Local Exchange Carrier and User Facility. This software may also be located elsewhere in the network or the user premise equipment, or in some combination of the network elements. What is important is that the Universal Service User be provided with access to a communications network, such access in some cases being usable only when a third party wishing to call or to receive calls from the USU has agreed to pay a fairly substantial metered or fixed rate for placement of the call.

Figure 3:
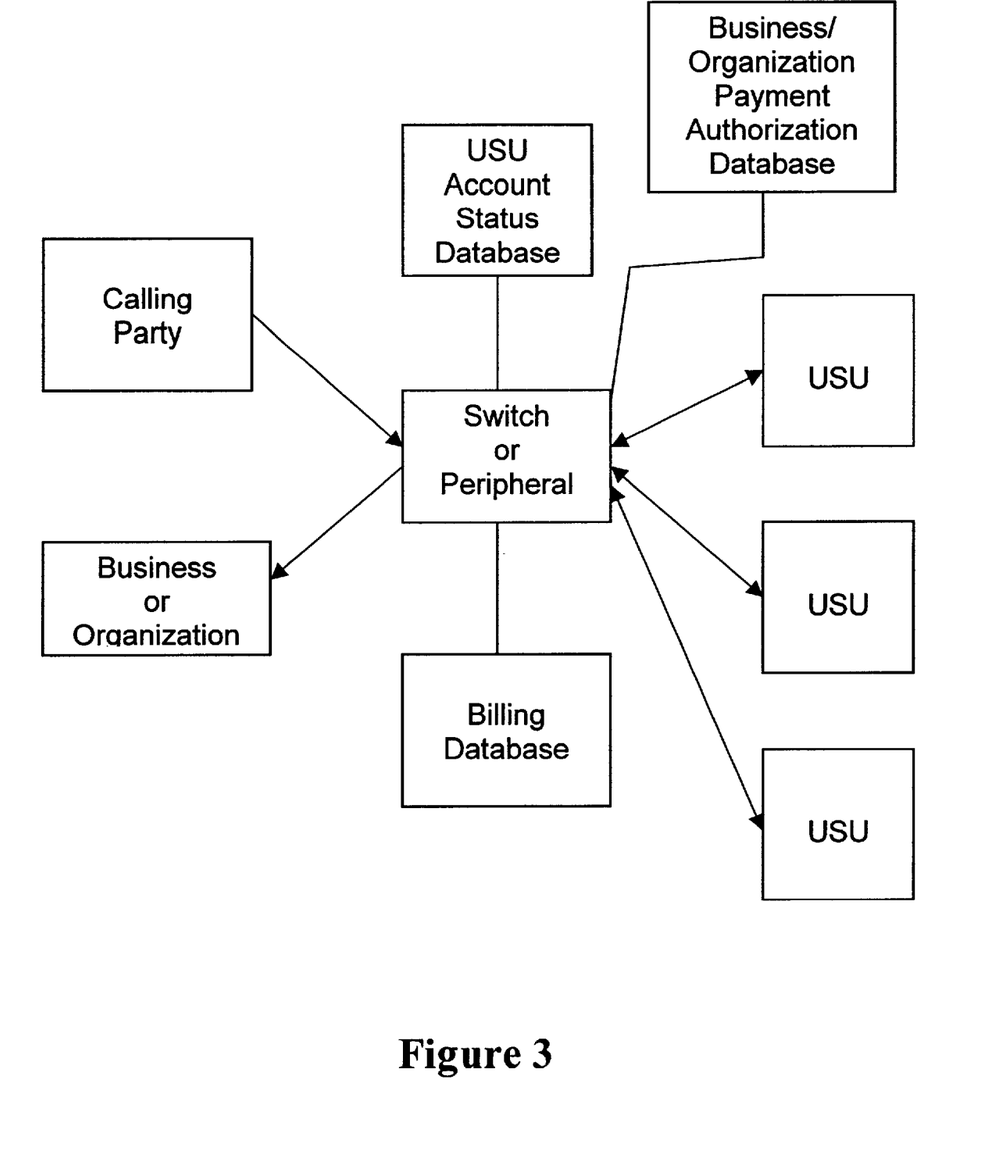
FIG. 3 is an illustration of a simplified block diagram of the preferred embodiment of the switching system according to the present invention.

FIG. 3 is a simplified block diagram of a preferred embodiment of the switching system according to the present invention, which implements the processes described herein. The switch is connected to USUs and other users, and to various calling parties wishing to place calls to USUs. The switch is also connected to various parties who may have arranged, or be willing to arrange, to pay the expenses involved in receiving calls from USUs. The switch has associated with it a billing database for storing billing information and generating bills and credit reports, a USU account status database for determining the prepaid status of a USU account, if any, and a payment authorization database for recording authorizations by businesses and other organizations. These authorizations may include either generally authorizing payment for USU-originated calls to a certain number, authorization for certain outgoing calls to the organization or other predetermined numbers, authorization for certain payment codes to be effective to place a call to a USU, and other authorizations described above.

The present invention may be applied in a business plan application according to the following discussion.

This business p proposes the creation of C-LECs with major users such as hospitals, universities, and local government agencies (HUGs) as co-owners. This enables users to turn cost centers into revenue centers with the possibility of entirely off-setting their current costs while out-sourcing the management and financing to the joint venture. For infrastructure based C-LECs, this approach attracts joint venture participation with large users that will quicken market entry, profitability, and rights of way acquisition. Creative third party billing techniques will protect the C-LECs from bad debts. Prospective industry partners are leaders in C-LEC management.

Regulatory restrictions on local phone service changed significantly in 1996 when Congress enacted The Telecommunications Act of 1996. The Act opened the way for the incumbent local exchange carriers (ILECs) to get into the long distance business if they allowed competition in their local phone markets.

Before they enter the long distance market, The Telecommunications Act of 1996 requires the incumbent local exchange carriers (I-LECs) to satisfy 14 conditions designed to help competitive local exchange carriers, or C-LECs, enter the local phone market. Given the large potential profits from long distance services, the I-LECs (from their point of view) are cooperating aggressively, making every effort to meet the law's 14 conditions as soon as possible. This has spawned wide spread interest among many institutions to try to get into the local phone business.

By the end of 1997, the public in many areas of the country will have more than one local telephone company competing for their business. Cable television companies, electric utilities, competitive access providers, wireless service licensees, long distance providers, and various combinations of the above will all be potential entrants into the local phone service markets.

The present invention makes possible a strategy for avoiding most of the problems that threaten cash flow of telecommunication firms entering new markets, namely, that of bad debt collection. To complicate this problem further, industry reports suggest that incumbent LECs will try to dump non-paying customers on their newly emerging competitors. This fear could keep a number of prospective competitors from joining the market. (See tele. com February 1997, p. 52)

The system of the present invention eliminates the non-payment problem. The software program classifies all of the customers on a fair but very conservative credit arrangement that can only be preempted by a pre-paid, or third party paid arrangement. This makes it possible to serve customers who cannot establish or fail to maintain credit. This highly conservative credit policy protects the investments made in the C-LECs, provides for higher profit margin services, and, at the same time, provides a unique spin-off social benefit to the communities served by the C-LEC as described below. With the present invention, a universal service friendly service agreement allows users to have pre-paid or third party paid phone service even when they have no credit. When individual customers are added to the phone company customer base, they can be added on a pre-paid or third party paid basis. The software according to the present invention will decrement these local phone service accounts on a real-time basis and be able to switch to a third-party payer basis as the account runs out of funds.

Once the customer's pre-paid account is out of funds, only collect calls, 1-800/888 calls, and 911 calls can be originated. Incoming calls will then be intercepted and callers will be asked for an additional charge if the caller wishes to complete the call. This will allow uninterrupted service to the user even though the pre-paid funds (if any) run out. This market driven solution to the universal service problem of service to those without funds to pay for service requires no tax or consumer subsidy. Each caller decides whether or not it is worthwhile to pay the extra charge for a specific call. If it is worthwhile, the customer pays. If not, the caller may decline and the call is not placed. In many cases, HUGs themselves will be able to maintain contact with clients that otherwise could not be cost effectively reached.

This universal service solution would eliminate the potential problem of having poorly paying clients dumped on a new service company by the incumbent LEC. All non-paying customers could be welcomed on the pre-paid and third party payer basis without loss to the new service provider. This approach requires no income testing. Even the wealthy are welcomed to this service. This differentiator can provide substantial public policy, regulatory, political, and public relations benefits while protecting investor assets. It should also be priced to bring far higher margins than traditional telephony services.

The present invention can thus be used in a partnership arrangement between a new alternative local phone service provider and partners among hospitals, universities, and local governmental agencies (HUGs) in the transformation of their telecommunications cost centers into revenue centers. The goal of this partnership is to off-set 100% of all current costs to the partner with savings and revenue. By joining experienced partners as co-owners of an alternative local phone company, this off-set is possible without having to manage a new line of business. In effect, the operational management is contracted out to the partners.

In this application of the present invention, these resources are organized so that the hospitals, universities, and government agencies (HUGs) can become C-LECs themselves rather than continuing to use the I-LEC or purchasing a variety of services from a series of individual providers. Furthermore, this is done at a lower price for improved and more varied services than was offered by the I-LECs.

By applying for C-LEC status, customer premises-based providers, such as hospitals, colleges and universities, and local governments can turn their existing internal telecommunications networks and infrastructure into the core of their own, captive C-LEC, and realize the cost savings and operational control that this transformation brings. By expanding the C-LEC through the addition of user/customers, with whom the core provider may already be doing business, or to the local community at large, the C-LEC will be able to resell services, purchased at deep discounts, to the C-LECs customers and share in the revenue from the transactions.

When the C-LEC is expanded beyond the original customer premises base, the risk of taking on "bad debt" can be effectively eliminated through the use of pre-pay and third-party-pay applications according to the present invention, which are software-based. This means that the C-LEC will avoid having to try to collect from customers who are unable or unwilling to pay their bills.

Processing of incoming calls to a pre-paid subscriber is accomplished in the following manner:

Step 1. Check Pre-pay Account of Called Party, as Call is Processed

IF $, Then Connect (Give Warning if Close)

IF $0, Then Do Step 2

Step 2. Give Message to Caller "This Call Requires an Additional $X/Min.

Please Press # to Accept this Charge on Your Phone Bill or

Press * to Place it on a Credit Card".

Step 3. If Caller Agrees, Connect and Bill.

The Steps to Cost Reduction, Revenue, and Network Quality:

The preferred C-LEC development process using the present invention is divided into six steps.

Step One—Feasibility study—defines the technical, business, regulatory, and financial requirements, the opportunity, the partnership/team, and the time line.

Step 2—Develop Pre-C-LEC operations and submit C-LEC application.

Prior to receiving authorization to function as a C-LEC, it is possible to initiate tele-management services. Tele-management activity positions the nascent C-LEC in the role of telephone service manager, functionally between the I-LEC and the end user. The tele-manager receives a discount on services from the I-LEC in return for management services. This provides early cost reductions. Pre C-LEC status tele-management discounts are available from the I-LECs as well as from alternate C-LECs.

Business, technical, and legal advisors develop the application, review it with HUG participants, submit it and the tariff agreement to the Public Service Commission and negotiate the resale agreement with the I-LEC.

Step 3—Commence C-LEC operations.

C-LEC status makes it possible to receive the deepest wholesale discounts from the incumbent local exchange carrier thereby reducing the costs of local telephony services for the C-LEC partners to their minimum level and receive revenue for the completion of long distance calls.

Step 4—Resell C-LEC services.

The C-LEC can begin to collect revenues by reselling telephony services to its business affiliates. Discounted services to business affiliates can strengthen service ties to customers while bringing in revenue that can far exceed pre C-LEC operational costs.

Step 5—Deploy advanced applications.

The use of the network can be expanded through the institution of advanced applications that create value for the C-LEC user community in areas such as energy and image management, LAN/WAN management, wireless communications, fax, internet, email and added voice services. The mix of advanced applications to be offered with the timing of their introduction for sale by the C-LEC is decided based upon the needs of the premises provider, the customer base and other factors. Initial applications such as energy management can be explored during the initial feasibility study phase.

Step 6—Unbundle and competitively source network elements.

Specific elements of network services can be out-sourced to suppliers other than the I-LEC in order to enhance service characteristics and further reduce costs. These service elements will be available either from infrastructure-based C-LECs formed by utilities, cable companies, competitive access providers, long distance providers, and wireless licensees, or from specific service providers that will be created to serve C-LECs.

Thus, there has been disclosed a significantly improved system and method for controlling access and billing to provide universal local and distance telephone service, as well as access to other communications networks.

What is claimed is:

1. A method of operating a telecommunications device, comprising the steps of:

using said telecommunications device to detect an outgoing call from a calling party to a called number;

using a calling number to determine whether said calling party is a universal service user;

determining whether the called number is among a class of numbers exempt from charges and, if so, connecting said call;

determining whether sufficient funds exist in a pre-paid account to cover charges associated with said outgoing call;

if said sufficient funds determining step results in a determination that sufficient funds do not exist, generating and sending a message to said calling party requesting authorization to charge said calling party or a third party an additional fee for connecting said calling party to said called party;

receiving user input from said calling party indicating said calling party's authorization of said additional charge; and, connecting said calling party to said called party.

2. The method according to claim 1, wherein said step of determining whether the called number is among a class of numbers exempt from charges comprise the step of determining whether said called number is a 911 emergency assistance number.

3. The method according to claim 1, wherein said step of determining whether the called number is among a class of numbers except from charges comprise the step of determining whether said called number is a toll-free number.

4. The method in accordance with claim 1, wherein said data call contains multimedia content.

* * * * *

UNITED STATES PATENT AND TRADEMARK OFFICE
CERTIFICATE OF CORRECTION

PATENT NO.    : 6,285,749 B1                                   Page 1 of 1
DATED         : September 4, 2001
INVENTOR(S)   : Charles L. Manto It is certified that error appears in the above-identified patent and that said Letters Patent is hereby corrected as shown below:

Column 1,
Line 15, delete "bier" and insert therefor -- barrier --;
Line 16, delete "ling" and insert therefor -- lacking --;
Line 18, delete "it" and insert therefor -- the --;
Line 24, delete "arc" and insert therefor -- are --;
Line 25, delete "mad" and insert therefor -- and --;
Line 38, after "providing" delete the comma.

Column 2,
Line 17, delete "network" and insert therefor -- networks --;
Line 21, delete "calls." and insert therefor -- calls instead. --; after "However," delete "a telephone";
Line 22, after "collect calls," insert -- toll free --;
Line 25, after "caller" insert -- to decide of they wish to complete the call to the free user, on the condition that the caller --.

Column 10,
Line 30, delete "except" and insert therefor -- exempt --.

Signed and Sealed this

Twenty-third Day of April, 2002

Attest:

*Attesting Officer*

JAMES E. ROGAN
*Director of the United States Patent and Trademark Office*